United States Patent
Minai et al.

[11] Patent Number: 5,844,654
[45] Date of Patent: Dec. 1, 1998

[54] BIODEGRADABLE RESIN FOR FORMING SPECTACLE-MOLDED BODY AND SPECTACLE-MOLDED BODY

[75] Inventors: Yoshihiro Minai, Kyoto; Shotaro Tanaka, Sabae, both of Japan

[73] Assignees: Shimadzu Corporation, Kyoto; Tanaka Production Co., Ltd., Sabae, both of Japan

[21] Appl. No.: 959,449

[22] Filed: Oct. 28, 1997

[30] Foreign Application Priority Data

May 28, 1997 [JP] Japan ................................. 9-154514

[51] Int. Cl.$^6$ .......................... G02C 13/00; C08G 63/08
[52] U.S. Cl. ........................... 351/41; 528/354; 528/361; 351/41
[58] Field of Search ........................ 528/361, 354; 351/41

[56] References Cited

U.S. PATENT DOCUMENTS 5,770,682   6/1998   Ohara et al. ......................... 528/354

*Primary Examiner*—Samuel A. Acquah
*Attorney, Agent, or Firm*—Nikaido, Marmelstein, Murray & Oram LLP

[57] ABSTRACT

There are provided a biodegradable resin for forming spectacle-molded body, being free of any problem on the skin upon contact with spectacles including it, being superior to corrosion resistance, and reducing the problem of disposal thereof after use, as well as a spectacle-molded body formed therefrom.

The spectacle-molded body is prepared in a usual manner from aliphatic polyester type biodegradable resin, particularly polylactic acid resin. The spectacle-molded body includes nose pads (1*a*), rim (1*b*), earpieces (2*b*), temples (2*a*), and integrated bodies (1), (2) etc. of at least two of these members, as well as demonstration lenses.

7 Claims, 1 Drawing Sheet

BIODEGRADABLE RESIN FOR FORMING SPECTACLE-MOLDED BODY AND SPECTACLE-MOLDED BODY

BACKGROUND OF THE INVENTION

1. Field of the Invention

The present invention relates to an aliphatic polyester type biodegradable resin for forming a spectacle-molded body, and a spectacle-molded body formed therefrom.

2. Description of Rerated Art

Conventionally, the materials for spectacle-molded bodies have made use of cellulose acetate, nylon, vinyl chloride resin, polyurethane resin, silicon resin, CP (a product of Eastman Kodak Co.), etc. And an anti-fungus agent is impregnated in, kneaded with, or coated on, these materials.

However, the spectacle-molded body consisting of cellulose acetate as the mainstream of the above starting materials suffers from problems such as occurrence of a rash on the skin in contact with the spectacles due to elution of various kinds of added plasticizer.

On the other side, the above various materials suffer from the problem of their disposal after use. That is, when the resin of these materials burns up, poisonous gases (e.g. isocyanate in the case of polyurethane resin) occur as is the case with conventional plastics, while a land for dumping thereof is also limited, so the disposal of these materials is a serious problem. If they are disposed of in the natural environment, there occurs another problem because they will remain without decomposition due to the stability of resin, thus not only deteriorating the landscape but also polluting the environment for oceanic life.

SUMMARY OF THE INVENTION

Therefore, the object of the present invention is to solve the above problems and provide an aliphatic polyester type biodegradable resin for forming a spectacle-molded body, being free of any problem or the skin upon contact with spectacles, being superior to corrosion resistance while reducing the problem of disposal thereof after use, as well as a spectacle-molded body formed therefrom.

As a result of their eager study to solve the problems, the present inventors found that an excellent spectacle-molded body can be obtained by using aliphatic polyester type biodegradable resin as the starting material, and they arrived thereby at the completion of the present invention.

That is, the present invention relates to an aliphatic polyester type biodegradable resin for forming a spectacle-molded body.

The present invention further relates to a spectacle-molded body formed from the aliphatic polyester type biodegradable resin. The aliphatic polyester type biodegradable resin is preferably polylactic acid resin. The polylactic acid resin includes copolymer of lactic acid, in addition to homopolymer of lactic acid.

The spectacle-molded body is, for example, at least one member selected from the group consisting of nose pads, a rim, temples, earpieces and an integrally molded body of at least two of these members. In the present invention, the spectacle-molded body encompasses demonstration lenses as well.

The spectacle-molded body of the present invention is easily disposed of after use because it has biodegradable characteristics due to the inclusion of biodegradable resin as a constitutional material.

If polylactic acid resin is used as the aliphatic polyester type biodegradable resin, the resulting molded body is particularly superior in resistance to corrosion due to sweat etc. to the conventional spectacle-molded body made of cellulose acetate. In addition, the spectacle-molded body of the present invention does not use any harmful materials to the human body, such as plasticizer etc., so it does not cause any rash on the skin upon contact with spectacles including it even for a long period of time, and thus it is significantly superior in biological safety.

As described above, very useful spectacle-molded bodies can be provided according to the present invention.

Figure 1:
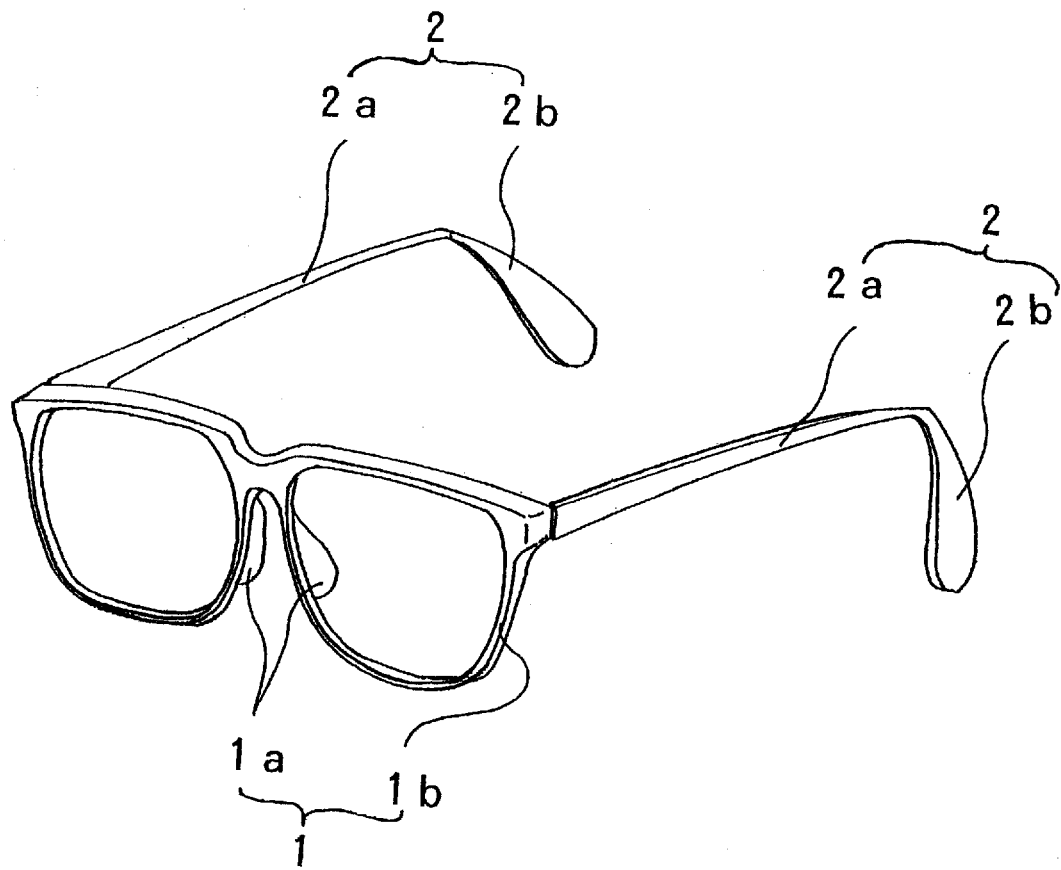
FIG. 1 shows one embodiment of the spectacle-molded body of the present invention.

The spectacle-molded body in FIG. 1 consists of an integrally molded body (1) of nose pads (1*a*) and rim (1*b*) and an integrally molded body (2) of a pair of left and right temples (2*a*) and earpieces (2*b*).

DETAILED DESCRIPTION OF THE INVENTION

The present invention relates to an aliphatic polyester type biodegradable resin for forming a spectacle-molded body. The present invention further relates to a spectacle-molded body formed from the aliphatic polyester type biodegradable resin.

Hereinafter, the present invention is described in detail.

The aliphatic polyester type biodegradable resin in the present invention includes e.g. poly (α-hydroxy acid) such as polyglycolic acid, polylactic acid etc.; poly (β-hydroxyalkanoate) such as poly-β-hydroxy butyric acid etc.; poly (ω-hydroxyalkanoate) such as poly-ε-caprolactone etc.; polyalkylene alkanoate such as polybutylene succinate, polyethylene succinate etc., and the like. These aliphatic polyester type resins are generally those with a melting point of 60° to 200° C., a glass transition point of 25° to 100° C., and a weight average molecular weight of about 100,000 to 300,000.

These aliphatic polyester type biodegradable resins possess shape-memorizing characteristics. That is, they can be thermally deformed generally at a temperature of not less than the glass transition point, and while keeping the deformation, the deformation can be fixed by cooling at a temperature of less than the glass transition point, and owing to the shape-memorizing characteristics, the molded body thus deformed will recover its original shape by heating again at a temperature of not less than the glass transition point.

Therefore, the spectacle-molded body obtained by forming the aliphatic polyester type resin into a general shape can be easily deformed into a shape adapted to each user by heating at a temperature of not less than the glass transition point of the resin. In particular, the optimum shapes of nose pads and earpieces vary depending on each user, so this advantage is particularly significant. To conduct thermal deformation easily, the glass transition point of the resin is preferably about 40° to 80° C.

In the present invention, the aliphatic polyester type biodegradable resin is preferably polylactic acid resin for reasons of excellent biodegradation characteristics, excellent corrosion resistance, high biological safety, absorption of lactic acid as its decomposition product into the living body, reasonable price, transparency, good coloration properties etc. With respect to biodegradation characteristics, while cellulose exhibited 73% decomposition, poly-L-lactic acid resin exhibited 93% decomposition in a biodegradation test in compost for 44 days, so its biodegradation characteristics are significantly superior. With respect to corrosion resistance, it did not swell in a strong artificial sweat test, as compared with conventional acetate cellulose. With respect to safety in the living body, the polylactic acid resin itself is safe, and further it does not require addition of a plasticizer, unlike conventional cellulose acetate, so it does not cause any rash on the skin upon contact with spectacles including it even for a long period of time.

In the present invention, the polylactic acid resin preferably has a melting point of 160° to 200° C., a glass transition point of 45° to 75° C., and a weight average molecular weight of 150,000 to 250,000. With its glass transition point given in such a range, a temperature exceeding the glass transition point can be easily attained for deformation, ant while keeping its deformation, it can be cooled to a temperature of less than the glass transition point to fix its deformation and this deformation can be kept at room temperature or thereabout. A more preferable glass transition point is in the range of 50° to 60° C. If the weight average molecular weight is less than 100,000, polymer molecule chains tangle less while shape-memorizing characteristics are hardly expressed.

On the other hand, if the weight average molecular weight exceeds 300,000, moldability is easily deteriorated.

The polylactic acid resin may be poly-L-lactic acids, or poly-D,L-lactic acid containing D-lactic acid as constitutional units. The content of the D-lactic acid unit in the poly-D, L-lactic acid is preferably up to 40 mole-%. If the D-lactic acid unit exceeds 40 mole-%, the molecular weight of the resulting poly-D,L-lactic acid will be low (10,000 or less). The polylactic acid preferably used in the present invention is poly-L-lactic acid, or poly-D,L-lactic acid containing up to 20 mole-% D-lactic acid as a constitutional unit.

Further, the polylactic acid resin may be a lactic acid copolymer having other components copolymerizable with the lactic acid monomer or lactide copolymerized in it. Such other components include compounds carrying two or more ester-linkage-forming functional groups, such as dicarboxylic acids, polyhydric alcohols, hydroxycarboxylic acids, lactones etc.

Examples of the dicarboxylic acid include succinic acid, azelaic acid, sebacic acid, terephthalic acid, isophthalic acid and the like.

Examples of the polyhydric alcohol include aromatic polyhydric alcohol such as adduct of bisphenol with ethylene oxide and the like; aliphatic polyhydric alcohol such as ethylene glycol, propylene glycol, butanediol, hexanediol, octanediol, glycerine, sorbitan, trimethylolpropane, neopentyl glycol and the like; and ether glycol such as diethylene glycol, triethylene glycol, polyethylene glycol, polypropylene glycol and the like.

Examples of the hydroxycarboxylic acid include glycolic acid, hydroxybutylcarboxylic acid, those described in Japanese Laid-open Patent Publication No. 6-184417 (1994) and the like.

Examples of the lactone include glycolide, ε-caprolactoneglycolide, ε-caprolactone, β-propiolactone, δ-butyrolactone, β- or γ-butyrolactone, pivalolactone, δ-valerolactone and the like.

Polylactic acid can be synthesized in a method known in the art. That is, it can be synthesized by direct dehydration-condensation from lactic acid as described in Japanese Laid-open Patent Publication No. 7-33861 (1995), Japanese Laid-open Patent Publication No. 59-96123 (1984), Collection of Preliminary Articles in Forum for Polymer, vol. 44, pp. 3198–3199, or by ring-opening polymerization of lactide (cyclic dimer of lactic acids).

When direct dehydration-condensation is to be carried out, the lactic acid used may be any of L-lactic acid, D-lactic acid, DL-lactic acid and a mixture thereof. When ring-opening polymerization is to be carried out, the lactide used may be any of L-lactide, D-lactide, DL-lactide, meso-lactide and a mixture thereof.

For example, various synthesis, purification and polymerization operations of the lactide are described in literatures such as U.S. Pat. No. 4,057,537, EP-A-261572, Polymer Bulletin, 14, 491–495 (1985), Makromole Chem., 187, 1611–1628 (1986) and the like.

The catalyst used in this polymerization reaction is not particularly limited, and any known catalysts for polymerization of lactic acid can be used. For example, organic tin compounds such as tin lactate, tin tartrate, tin dicaprylate, tin dilaurylate, tin dipalmitate, tin distearate, tin dioleate, tin α-naphthoate, tin β-naphethoate, tin octylate etc., powdery tin; zinc dust, zinc halide, zinc oxide, organic zinc compounds; titanium compounds such as tetrapropyl titanate etc.; zirconium compounds such as zirconium isopropoxide etc.; antimony compounds such as antimony trioxide, etc.

Among these, the catalyst consisting of tin or a tin compound is particularly preferable in respect of activity. The amount of the catalyst used is generally in the range of 0.001 to 5% by weight of the lactide.

The polymerization reaction can be carried out in the presence of the above catalyst usually at a temperature of 100° C. to 200° C. depending on the type of the catalyst. The two-step polymerization as described in Japanese Laid-open Patent Publication No. 7-247345 (1995) is also preferable.

In the present invention, conventional additives such as plasticizer (phthalate, etc.), stabilizers (calcium stearate etc.), coloring agents (orange chrome, titanium oxide etc.), fillers (calcium carbonate, clay, talc etc.), anti-oxidizers (alkylphenol, organic phosphite etc.), UV absorbers (salicylate, benzotriazole etc.), flame-retardant (phosphate, antimony oxide etc.), anti-static agents, anti-fungus agents etc. can be added as necessary to the aliphatic polyester type biodegradable resin. The amount of these additives can be suitably selected.

The method of admixing the above various additives with the aliphatic polyester type biodegradable resin in the present invention is particularly not limited and can be effected in any method known in the art. For example, a mill roll, Banbury mixer, super mixer, single- or twin-screw extruder etc. may be used for mixing and kneading thereof.

The resin composition thus kneaded is molded into a desired shape of the spectacle-molded body at a temperature of not less than the melting point of the resin. This molding can be carried out using injection molding in the same manner as for conventional plastics. The molding temperature is usually in the range of about 100° to 300° C.

The spectacle-molded body may be any member selected from nose pads, a rim, temples, earpieces, etc. or an integrally molded body of at least two of these members. The integrally molded body of at least two of these members includes e. g. an integrally molded body of nose pads and a rim; an integrally molded body of temples and earpieces; and an integrally molded body of nose pads, a rim, temples and earpieces.

A spectacle-molded body adapted to each user can be obtained by deforming the general shape of the resulting spectacle-molded body at a temperature ranging from the glass transition point of the resin to the molding temperature, and then fixing the deformation by cooling at a temperature of less than the glass transition point. Although the lower limit of the temperature for deformation is usually a temperature of not less than the glass transition point, a temperature of less than the glass transition point can also be used for deformation.

For deformation, the molded body is placed in e.g. heating air, heating water, or water vapor in such a temperature atmosphere and deformed e.g. by hand or in a suitable mold, roll, tensile apparatus, or squeeze apparatus. If the glass transition point of the resin is in the range of 40° to 80° C. or thereabout, deformation can be effected easily by immersing the spectacle-molded body of general shape in hot water at a slightly higher temperature than the glass transition point.

If, while maintaining its deformation, the spectacle-molded body thus deformed is cooled at a temperature of less than the glass transition point, the spectacle-molded body is obtained with the deformation being fixed, and this deformation can be kept at room temperature or thereabout.

Natural cooling in the air, for example, can be used to cool the deformed spectacle-molded body. In this manner, the spectacle-molded body of general shape can be thermally deformed to permit the shape of the spectacle-molded body to be adapted to each user.

A further example of the spectacle-molded body of the present invention includes demonstration lenses. The demonstration lenses are those tentatively attached to a spectacle frame particularly a rim to maintain the shape of the rim during transportation of the product, and usually the demonstration lenses would be needless after display in a shop.

The spectacle-molded body of the present invention is easily disposed of after use because it is biodegradable owing to the biodegradable resin incorporated as the constitutional material. This advantage of easy disposal is particularly outstanding in the case of demonstration lenses because they would usually be needless after display in a shop.

If polylactic acid resin is used as the aliphatic polyester type biodegradable resin, the resulting molded body is particularly superior in corrosion resistance, and its biological safety is particularly outstanding without causing any rash on the skin upon contact with spectacles including it even for a long period of time. Therefore, the spectacle-molded body of the present invention is of particularly high values as materials in contact with the skin, that is, as nose pads and earpieces. Further, in the present invention, the poly-L-lactic acid resin is preferable out of the polylactic acid resin.

As a matter of course, the spectacle-molded bodies of the present invention such as nose pads, earpieces etc. may be combined with a metallic rim and/or metallic temples to prepare the whole of a spectacle frame.

EXAMPLES

Hereinafter, the present invention is described in more detail with reference to the Examples.

Example 1 (Synthesis of poly L-lactic acid)

100 parts by weight of L-lactide (a product of Shimadzu Corporation), 0.05 part by weight of lauryl alcohol and 0. part by weight of tin octylate ("Cosmos 29", a ring-opening polymerization catalyst, produced by Gold Schmidt Co., Ltd.) were fed via an inlet into a twin-screw kneading extruder. The cylinder temperature was 190° C., and the rotation was 60 r.p.m. in the same direction, and a nitrogen gas was fed through the inlet. The average retention time in the twin-screw kneading extruder was 15 minutes. The resulting polymer was extruded through a nozzle of 2 mm in diameter. It was cooled for solidification and cult into chips of poly L-lactic acid resin. The resulting chips had a weight average molecular weight of 180,000, a melting point of 178° C., and a glass transition point of 58° C.

Example 2 (Molding of a spectacle-molded body)

The poly L-lactic acid resin obtained in Example 1 was injection-molded at 200° C. in the usual manner used for conventional cellulose acetate to prepare an integrally molded body (1) of nose pads (1a) and rim (1b) and an integrally molded body (2) of a pair of left and right temples (2a) and earpieces (2b).

Example 3 (Corrosion resistant test)

Nose pad A, prepared separately in the same manner as in Example 2 from the poly L-lactic acid resin obtained in Example 1, was examined in a corrosion resistance test. For comparison, nose pad B of the same shape was separately prepared in a usual manner using conventional cellulose acetate (Acechi, produced by Daicel Craft K.K.) and examined in the corrosion resistance test.

(Test 1: Cas test)
  The test conditions are as follows:
  Test machine: Cas Test Machine CASSER-ISO-3, manufactured by Suga Shikenki K.K.
  Composition of the test solution: 4% aqueous NaCl (with $CuCl_2$), pH 3.0
  Temperature of the test chamber: 50±1° C.
  Pressure of the spray: 1.0 $kg/cm^2$
  Testing time: 48 hours
  The result of the test indicated that there was no abnormality in both nose pads A and B.

(Test 2: Strong artificial sweat test)
  The test conditions are as follows:
  Composition of the test solution: 7 g NaCl, 1 g urea, 1 ml conc. hydrochloric acid, and 4.5 ml lactic acid in 95% methanol
  Temperature of the test chamber: 25° C. (in a desiccator)
  Testing time: 48 hours
  The result of the test indicated that the resin of nose pad A did not swell and there was no abnormality. On the other hand, the resin of nose pad B swelled. The nose pad A of the present invention is thus significantly superior in corrosion resistance.

Example 4 (Thermal deformation properties)

This example is to show thermal deformation of the integrally molded body (2) of temples (2a) and earpieces (2b) prepared in Example 2. The part of earpieces (2b) in the resulting spectacle-molded body (2) was immersed in water in a thermostatic chamber at 70° C. and deformed by hand in consideration of the shape of the ears of the user.

While keeping this shape, it was cooled naturally in the air for 15 seconds to fix the deformation. The earpieces (2b) of this spectacle-molded body had a shape adapted to the ears of the user.

What is claimed is:

1. An aliphatic polyester type biodegradable resin for forming a spectacle-molded body.

2. A spectacle-molded body formed from aliphatic polyester type biodegradable resin.

3. A spectacle-molded body according to claim 2, wherein the aliphatic polyester type biodegradable resin is polylactic acid resin.

4. A spectacle-molded body according to claim 2 or 3, wherein the spectacle-molded body is at least one member selected from the group consisting of nose pads, a rim, temples, earpieces and an integrally molded body of at least two of these members.

5. A spectacle-molded body according to claim 2 or 3, wherein the spectacle-molded body is demonstration lenses.

6. A spectacle-molded body according to claim 4, which has corrosion resistance in a strong artificial sweat test.

7. A spectacle-molded body according to claim 6, which is formed from aliphatic polyester type biodegradable resin with a glass transition point of 40° C. to 80° C. and has a thermal deformation ability.

\* \* \* \* \*

UNITED STATES PATENT AND TRADEMARK OFFICE
CERTIFICATE OF CORRECTION

PATENT NO. : 5,844,654
DATED : December 1, 1998
INVENTOR(S) : Yoshihiro Minai, Shotaro Tanaka It is certified that error appears in the above-indentified patent and that said Letters Patent is hereby corrected as shown below:

Cancel claims 1 and 2 without prejudice.

claims 3-5 and 7 should read as follows:

3. A spectacle-molded body formed from aliphatic polyester type biodegradable resin wherein the aliphatic polyester type biodegradable resin consists essentially of polylactic acid resin.

4. A spectacle-molded body according to claim 3, wherein the spectacle-molded body is at least one member selected from the group consisting of nose pads, a rim, temples, earpieces and an integrally molded body of at least two of these members.

5. A spectacle-molded body according to claim 3, wherein the spectacle-molded body is demonstration lens.

UNITED STATES PATENT AND TRADEMARK OFFICE
CERTIFICATE OF CORRECTION

PATENT NO. : 5,844,654

DATED : December 1, 1998

INVENTOR(S) : Yoshihiro Minai, Shotaro Tanaka

It is certified that error appears in the above-indentified patent and that said Letters Patent is hereby corrected as shown below:

7. A spectacle-molded body according to claim 6, which is formed from aliphatic polyester type biodegradable resin consisting essentially of polylactic acid resin with a glass transition point of 40°C to 80°C and has a thermal deformation ability.

Signed and Sealed this

Nineteenth Day of October, 1999

Attest:

Q. TODD DICKINSON

Attesting Officer

Acting Commissioner of Patents and Trademarks